US010399687B2

(12) United States Patent
Kawai et al.

(10) Patent No.: US 10,399,687 B2
(45) Date of Patent: Sep. 3, 2019

(54) METHODS AND APPARATUS TO VARY AN AIR INTAKE OF AIRCRAFT ENGINES

(71) Applicant: The Boeing Company, Chicago, IL (US)

(72) Inventors: Ronald Tatsuji Kawai, Rancho Palos Verdes, CA (US); John T. Bonet, Placentia, CA (US)

(73) Assignee: The Boeing Company, Chicago, IL (US)

( * ) Notice: Subject to any disclaimer, the term of this patent is extended or adjusted under 35 U.S.C. 154(b) by 388 days.

(21) Appl. No.: 14/958,530

(22) Filed: Dec. 3, 2015

(65) Prior Publication Data

US 2017/0158341 A1 Jun. 8, 2017

(51) Int. Cl.
| | | |
|---|---|---|
| *F02K 3/06* | (2006.01) | |
| *B64D 29/06* | (2006.01) | |
| *B64D 33/02* | (2006.01) | |
| *F01D 17/10* | (2006.01) | |
| *F01D 17/12* | (2006.01) | |
| *F01D 17/16* | (2006.01) | |
| *F02C 7/042* | (2006.01) | |
| *F02K 3/075* | (2006.01) | |

(52) U.S. Cl.
CPC ............ *B64D 29/06* (2013.01); *B64D 33/02* (2013.01); *F01D 17/105* (2013.01); *F01D 17/12* (2013.01); *F01D 17/16* (2013.01); *F02C 7/042* (2013.01); *F02K 3/06* (2013.01); *F02K 3/075* (2013.01); *B64D 2033/0286* (2013.01)

(58) Field of Classification Search
CPC ........................................ B64D 29/06; B64D 33/02; B64D 2033/0286; F02C 7/045; F02C 7/042
See application file for complete search history.

(56) References Cited

U.S. PATENT DOCUMENTS

| | | | |
|---|---|---|---|
| 3,058,693 A | 10/1962 | Doak | |
| 3,222,863 A | 12/1965 | Klees et al. | |
| 4,047,911 A * | 9/1977 | Krojer | F02C 7/05 |
| | | | 244/53 B |

(Continued)

FOREIGN PATENT DOCUMENTS

| | | |
|---|---|---|
| EP | 2072779 | 6/2009 |
| EP | 3176092 | 6/2017 |

(Continued)

OTHER PUBLICATIONS

Daggett et al., "Ultra-Efficient Engine Diameter Study," May 2003, NASA/CR—2003-212309, 63 pages.

(Continued)

*Primary Examiner* — David E Sosnowski
*Assistant Examiner* — Brian P Wolcott
(74) *Attorney, Agent, or Firm* — Hanley, Flight & Zimmerman, LLC (57) ABSTRACT

Methods and apparatus to vary an air intake of aircraft engines are disclosed. An example nacelle assembly includes a fan cowl and an inlet cowl movably coupled to the fan cowl. The inlet cowl defines a primary flow path and an auxiliary flow path of an intake of the aircraft engine. The inlet cowl moves relative to the fan cowl between an open position to allow airflow via an auxiliary flow path and a closed position to prevent airflow through the auxiliary flow path.

12 Claims, 9 Drawing Sheets

(56) References Cited

U.S. PATENT DOCUMENTS

| | | | | |
|---|---|---|---|---|
| 5,014,933 | A * | 5/1991 | Harm | B64D 33/02 |
| | | | | 181/215 |
| 5,865,398 | A * | 2/1999 | Pashea | B64D 33/02 |
| | | | | 244/53 B |
| 8,205,430 | B2 | 6/2012 | Jain | |
| 8,591,173 | B2 | 11/2013 | Bouru et al. | |
| 2008/0283676 | A1 | 11/2008 | Jain et al. | |
| 2009/0092482 | A1 | 4/2009 | Winter | |
| 2010/0019100 | A1 | 1/2010 | Smith et al. | |
| 2012/0073263 | A1 | 3/2012 | Kohlenberg et al. | |
| 2014/0271169 | A1 | 9/2014 | James et al. | |
| 2017/0327240 | A1 * | 11/2017 | Kerbler | B64D 29/06 |

FOREIGN PATENT DOCUMENTS

| | | | | |
|---|---|---|---|---|
| FR | 1204525 | | 1/1960 | |
| FR | 1204525 | A * | 1/1960 | B64C 39/062 |
| FR | 2757823 | | 7/1998 | |
| FR | 2936559 | | 4/2010 | |
| WO | 2008045035 | | 4/2008 | |

OTHER PUBLICATIONS

Hughes, "The Promise and Challenges of Ultra High Bypass Ratio Engine Technology and Integration," NASA Glenn Research Center, presented at the Jan. 4-7, 2011 AIAA Aero Sciences Meeting, published Jan. 7, 2011, 10 pages.

Pritamashutosh, "Subsonic and Supersonic Inlet for Jet Engine," published Feb. 19, 2014, https://pritamashutosh.wordpress.com/2014/02/19/subsonic-and-supersonic-inlet-for-jet-engine/, last retrieved on Dec. 1, 2015.

András Sóbester, "Tradeoffs in Jet Inlet Design: A Historical Perspective," Journal of Aircraft, vol. 44, No. 3, May-Jun. 2007, 13 pages.

James M. Saylor and Robert E. Smith, Jr., "Internal and External Aerodynamics of the C-141A Nacelle," AIAA Paper No. 65-604, AIAA Propulsion Joint Specialist Conference, Colorado Springs, Colorado, Jun. 14-18, 1965, 20 pages.

E.R. Glasgow, W.E. Beckt, R.R. Woollett J., "Zero-Length Slotted-Lip Inlet for Subsonic Military Aircraft," AIAA 80-1245R, pp. 112-118, J. Aircraft vol. 19, No. 2, Feb. 1982, 7 pages.

European Patent Office, "Extended European Search Report," issued in connection with European Patent Application No. 16190453.7, dated May 11, 2017, 9 pages.

European Patent Office, "Extended European Search Report," issued in connection with European Patent Application No. 19157871.5, dated Jun. 4, 2019, 9 pages.

\* cited by examiner

METHODS AND APPARATUS TO VARY AN AIR INTAKE OF AIRCRAFT ENGINES

FIELD OF THE DISCLOSURE

This patent relates generally to aircraft engines and, more particularly, to methods and apparatus to vary an intake of aircraft engines.

BACKGROUND

To achieve adequate and/or increased turbofan engine efficiency, high bypass turbofan aircraft engines typically use large diameter fans. However, increasing a fan diameter increases a size and/or diameter of a nacelle of the turbofan engine that supports the larger diameter fan of the turbofan engine. In some instances, the increased size of the nacelle results in increased drag and/or weight that may offset some of the propulsive efficiencies achieved by high bypass turbofan engines.

SUMMARY

An example nacelle apparatus includes a fan cowl and an inlet cowl movably coupled to the fan cowl. The inlet cowl defines a primary flow path and an auxiliary flow path of an intake of the aircraft engine. The inlet cowl moves relative to the fan cowl between an open position to allow airflow via an auxiliary flow path and a closed position to prevent airflow through the auxiliary flow path.

In another example, a nacelle apparatus for use with an aircraft engine includes a forward section defining an air intake of the aircraft engine. The forward section moves relative to an intermediate section. The intermediate section houses a fan of the aircraft engine. An inlet lip is coupled to the forward section. The forward section translates relative to the intermediate section between a first open position and a closed position to change an axial length between the inlet lip and the fan.

An example method to control inlet airflow through a nacelle of an aircraft engine includes translating an inlet cowl relative to a fan cowl to a first open position to allow airflow to the aircraft engine via a primary flow path and an auxiliary flow path during a take-off condition of an aircraft; and translating the inlet cowl relative to the fan cowl to a closed position to prevent airflow through the auxiliary flow path and allow airflow to the aircraft engine via the primary flow path during a cruise condition of the aircraft, where an inlet of the aircraft engine is closer to a fan of the aircraft engine in a direction along a longitudinal axis of the fan when the inlet cowl is in the closed position than when the inlet cowl is in the first open position.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located there between. Stating that any part is in direct contact with another part means that there is no intermediate part between the two parts.

DETAILED DESCRIPTION

To increase an aircraft engine performance (e.g., reduce the specific fuel consumption ratio), propulsion systems of turbofan aircraft engines are configured to operate with relatively high bypass ratios. For example, some example ultra-high bypass turbofan engines may have bypass ratios between, for example, 10:1 to 25:1. To achieve the relatively higher bypass ratios, turbofan engines employ fans having relatively larger diameters. Such high bypass aircraft engines increase airflow greater than low-bypass turbofan engines (e.g., having bypass ratios of 3:1 or 5:1) that increases the propulsive efficiency for producing thrust. Thus, high bypass turbofan engines are more fuel efficient than low bypass turbofan engines for producing thrust with the same combustion energy. In addition to increasing propulsion efficiency, increasing a fan diameter of a turbofan engine reduces exhaust velocities with lower fan blade tip speeds that reduces noise output of an engine.

However, as the fan diameter increases (e.g., to provide a bypass ratio over 12:1), the weight and/or drag associated with a nacelle needed to house the larger fan may decrease the efficiency benefits provided by the larger diameter fans. In other words, the increased size of the nacelle results in increased drag and/or weight that may offset some of the propulsive efficiency achieved by high bypass turbofan engines. Specifically, an increase in drag and/or weight as a result of an increase in fan diameter may cause diminishing fuel burn efficiency even through thrust specific fuel consumption improves as a bypass ratio increases.

Increasing a diameter of the fan requires an increased size (e.g., a maximum outer diameter and/or an overall length) of a nacelle. In addition, an inlet should provide uniform, free stream airflow into the engine over various conditions that may be experienced by the aircraft. For example, the aircraft engine may experience different flight conditions that may vary throughout a flight path or operating envelope of an aircraft (e.g., taxing, take-off, cruise, cross-winds, engine stall, and/or landing). As a result, the inlet may be sized to allow maximum airflow that the engine can demand and, for all other conditions, the inlet spills any excess airflow. For example, at low speeds (e.g., during take-off, taxiing, etc.), the intake draws air from a capture area that is larger than a capture area at high speeds (e.g., during cruise). Thus, an inlet is often sized to provide sufficient airflow during take-off conditions and/or cross-wind conditions, at which an engine may demand suction around the inlet leading edge. When the airflow demanded by the engine is much less than the airflow that can be captured by the inlet, the difference in airflow is spilled around the inlet.

At low speeds, to prevent airflow separation along the outer surface of the inlet and the inner surface of the inlet, an inlet lip of the inlet located at the foremost edge of the nacelle is typically provided with a curved thickness to enable a smooth transition between an outer surface of the inlet and an inner surface of the inlet. A pointed or sharp inlet, for example, would cause flow separation with a non-uniform flow pa resulting in a distorted flow pattern that may cause aerodynamic stall and/or fatigue to blades of the fan. Because greater flow separation occurs during take-off and/or cross-wind conditions, an engine inlet often includes a lip having a thickness to support operation of the engine during specific flight conditions such as take-off, crosswinds and the like. However, the thicker the inlet lip, the greater the amount of flow spillage during cruise conditions of the aircraft. For example, 95% of fuel is consumed during cruise. Thus, an inlet lip thickness that favorably influences flow non-uniformity during take-off or cross-wind conditions increases air spillage during cruise, resulting in increased drag and reduced aircraft flight fuel efficiency. Thus, an inlet should produce high pressure recovery, low spillage drag, and low airflow distortion.

Some example aircraft engines employ blow-in-doors to reduce an inlet area or size. However, blow-in-doors significantly increase flyover noise when the doors are in an open position, in particular, blow-in-doors are spring loaded and open front lower internal static pressure at initial take-off and close when a rain pressure increases after initial climb out. Specifically, the blow-in-doors being in the open position during climb increases noise output of the engine. To reduce noise, modern inlets of current engines do not use blow-in-doors have relatively thicker inlet lips, which negate some of the propulsive efficiency improvement provided by ultra-high bypass ratio engines.

The example methods and apparatus disclosed herein improve aircraft engine performance by reducing drag and nacelle weight associated with flow spillage during cruise. In particular, the example methods and apparatus disclosed herein enable an area or diameter (e.g., a highlight area or diameter) of an intake of a nacelle to be closer to a free stream airflow capture area or diameter. In other words, the example methods and apparatus disclosed herein enable reduction of an inlet lip thickness, an intake outer cowl diameter and/or an inlet length of the nacelle (e.g., a distance between an inlet lip and a fan), thereby reducing flow spillage during spillage.

To reduce the size to reduce drag during cruise and/or weight of the nacelle, the example methods and apparatus disclosed herein employ a movable or translating cowl. More specifically, a nacelle assembly disclosed herein includes a forward section or inlet cowl that defines a primary flow path and an auxiliary flow path of an intake of the aircraft engine. The forward section of the nacelle moves relative to an intermediate section or fan cowl section between an open position and a closed position. The forward section moves to the open position to provide airflow to the aircraft engine via the primary flow path and the auxiliary flow path. The forward section moves to the closed position to prevent airflow through the auxiliary flow path. For example, the forward section moves to the open position to enable the aircraft engine to draw airflow via the auxiliary flow path during, for example, low speed flight conditions, and the closed position to prevent airflow through the auxiliary flow path during, for example, high speed flight conditions. The auxiliary flow path provides airflow through an opening that is non-parallel relative to a longitudinal axis of the primary flow path and/or the aircraft engine. Additionally, the example aircraft engines disclosed herein also vary, adjust and/or control of an amount of airflow to be provided to the aircraft engine via the auxiliary flow path. In some examples, the example aircraft engines disclosed herein allow airflow via the auxiliary flow path to be accurately controlled and/or varied via, for example, one or more vanes. In some examples, the vanes are movable between a first position to provide in-flow during take-off and a second position to provide outflow during an engine out condition.

Figure 1:
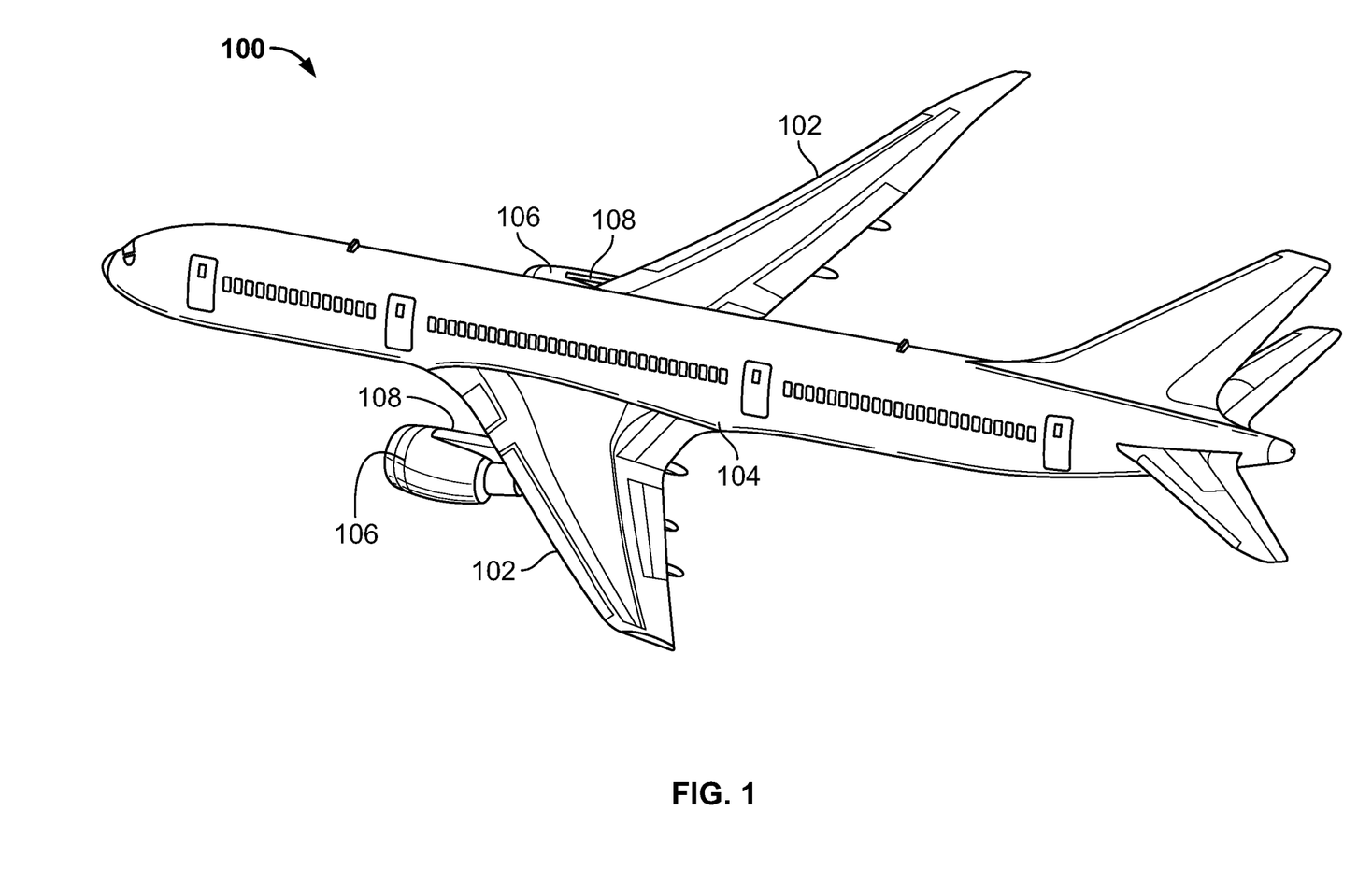
FIG. 1 depicts an example aircraft having an aircraft engine constructed in accordance with the teachings disclosed herein.

FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. Each aircraft engine 106 of the illustrated example is a turbofan engine that may embody aspects of the teachings of this disclosure.

Figure 2:
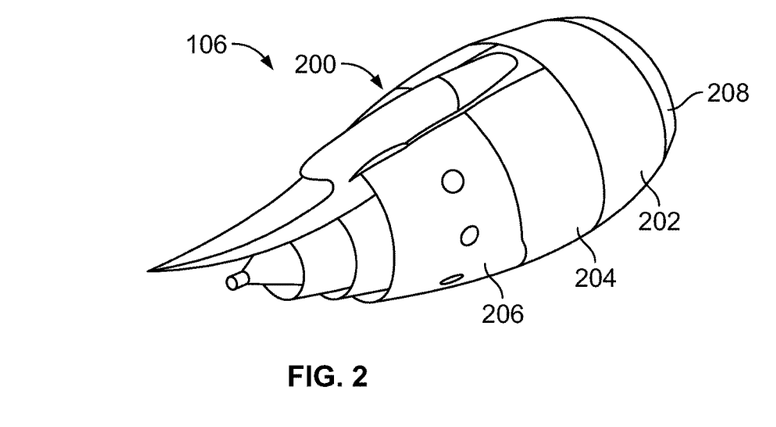
FIG. 2 is a perspective view of an example aircraft engine of FIG. 1 having a nacelle constructed in accordance with the teachings disclosed herein.

FIG. 2 is a perspective view of the aircraft engine 106 of FIG. 1 includes a nacelle 200 constructed in accordance with the teachings disclosed herein. The nacelle 200 provides a housing having an aerodynamic outer surface to reduce drag. The nacelle 200 of the illustrated example includes a forward section or inlet cowl 202 (e.g., an outer panel), an intermediate section or fan cowl 204 (e.g., a clam-shell cowl), and a reverse thruster 206. The reverse thruster 206 of the illustrated example forms or defines a portion of an outer surface of the nacelle 200. A leading edge 208 of the nacelle 200 is coupled or mounted to the inlet cowl 202. As described in greater detail below, the inlet cowl 202 of the nacelle 200 moves or translates relative to the fan cowl 204 during operation of the aircraft engine 106.

Figure 3:
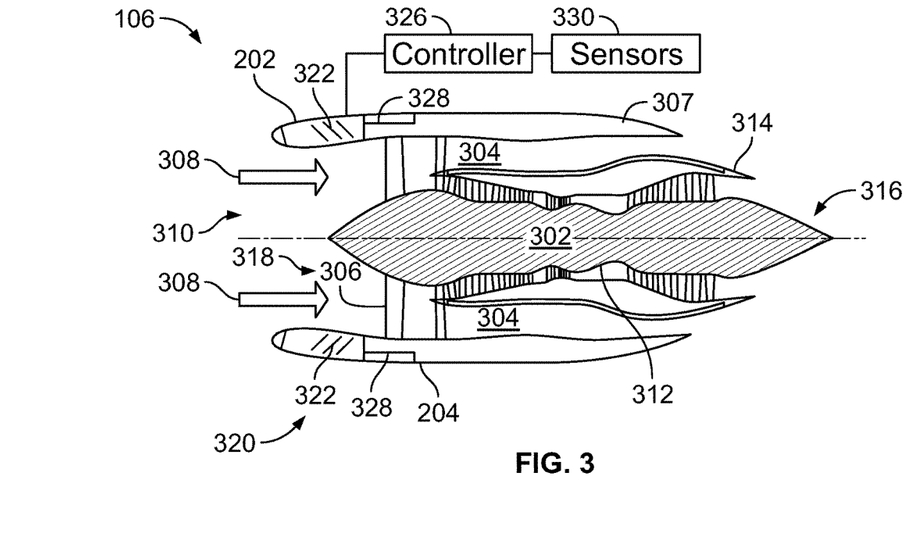
FIG. 3 is a cross-sectional view of the example aircraft engine of FIGS. 1-2.

FIG. 3 is a cross-sectional view of the example aircraft engine 106 of FIG. 1. As illustrated in FIG. 3, the aircraft engine 106 includes an engine core 302 and a bypass 304 (e.g., airflow channel) defined between the nacelle 200 and the engine core 302. The aircraft engine 106 is a gas turbine (e.g., a turbofan engine) having a fan 306 that draws airflow 308 into an air intake 310. The fan cowl 204 of the illustrated example houses the fan 306 of the aircraft engine 106. A portion of the airflow 308 flows to the engine core 302 and a portion of the airflow 308 flows through the bypass 304. The air provided by the air intake 310 to the engine core 302 is highly pressurized (e.g., via a compressor) and provided to a combustion chamber 312 of the engine core 302, where fuel is injected and mixed with the highly pressurized air and ignited. The thermal energy from the combustion chamber 312 of the engine core 302 powers the fan 306 (e.g., via a turbine) and through a nozzle 314 where it produces thrust additive to the thrust from the bypass airflow. The converted thermal energy of the engine core 302 and the accelerated airflow of the bypass 304 are exhausted from an aft end of a fan duct 307 and the core engine 316 of the aircraft engine 106 to produce forward thrust that propels the aircraft 100 (e.g., in a forward direction).

The inlet cowl 202 of the illustrated example defines the air intake 310 of the aircraft engine 106. The air intake 310 of the illustrated example includes a primary inlet or primary flow path 318 through which airflow is provided to the fan 306 during, for example cruise conditions. To help draw airflow through the air intake 310 during other flow conditions (e.g., during take-off with or without crosswinds), the example inlet cowl 202 of the illustrated example moves or translates relative to the fan cowl 204 to provide (e.g., expose) an auxiliary inlet or auxiliary flow path 320. In the illustrated example, the inlet cowl 202 moves or actuates between a first or closed position (e.g., a stowed or non-deployed position) and a second or open position (e.g., a deployed position). In the illustrated example, the inlet cowl 202 selectively covers or uncovers one or more vanes 322 housed between the inlet cowl 202 and the fan cowl 204 and aft of the fan 306 when the inlet cowl 202 moves or translates relative to the fan cowl 204 between the first and second positions. As described in greater detail below, airflow in the primary flow path 318 is not affected by the auxiliary flow path 320 when the inlet cowl 202 is in the closed position. In some examples, airflow (e.g., a portion of the airflow) through the primary flow path 318 is supplemented with airflow via the auxiliary flow path 320 when the inlet cowl 202 is in the open position. In some examples such as engine out conditions, airflow through the primary flow path 318 is directed or diverted through the vanes 322 circumferentially outward from the nacelle 200 and/or away from the fan 306.

In operation, the inlet cowl 202 selectively moves relative to the fan cowl 204 to open and close the auxiliary flow path 320 in response to detecting (e.g., a controller detecting) an operational condition. For example, the operational condition includes a take-off condition, a climb condition, a cross-wind condition, an engine out condition, and/or a cruise condition.

To move the inlet cowl 202 of the illustrated example between the first position and second position, the aircraft engine 106 employs a control system 324. The control system 324 includes a controller 326 to operate an actuator 328 (e.g., a linear actuator, a hydraulic actuator, an electric actuator, a stepper motor, etc.) that moves the inlet cowl 202 between an open position and a closed position. For example, the actuator 328 may move the inlet cowl 202 relative to the fan cowl 204 to an open position during take-off and the actuator 328 may move the inlet cowl 202 relative to the fan cowl 204 to the closed position during a climb condition and/or a cruise condition of the aircraft 100. In the illustrated example, the controller 326 may be included in a Full Authority Digital Engine Controller (FADEC). The control system 324 may receive multiple input variables of current flight conditions from one or more sensors 330 including, for example, altitude, air speed, angle of attack, throttle lever position, and/or other parameter(s). In addition, some of the input variables (e.g., inlet airflow) are calculated or determined based on other measured conditions or parameter(s). The measured or detected flight conditions may be used by the controller 326 to determine flight conditions of the aircraft 100 (e.g., cruise, take-off, cross-winds, climb, descend, etc.). In some examples, the controller 326 operates the inlet cowl 202 based on a speed of the aircraft 100. For example, when the speed and altitude of the aircraft 100 is indicative of a climb or cruise conditions, the controller 326 moves the inlet cowl 202 to the closed position, and when the speed of the of aircraft 100 is indicative of a take-off condition or an engine out condition, moves the inlet cowl 202 to an open position. In some examples, the actuator 328 is manually operated via a pilot control panel. In some examples, the actuator 328 is manually operated via a lever (e.g., for inspection, servicing or repair on the ground).

Figure 4:
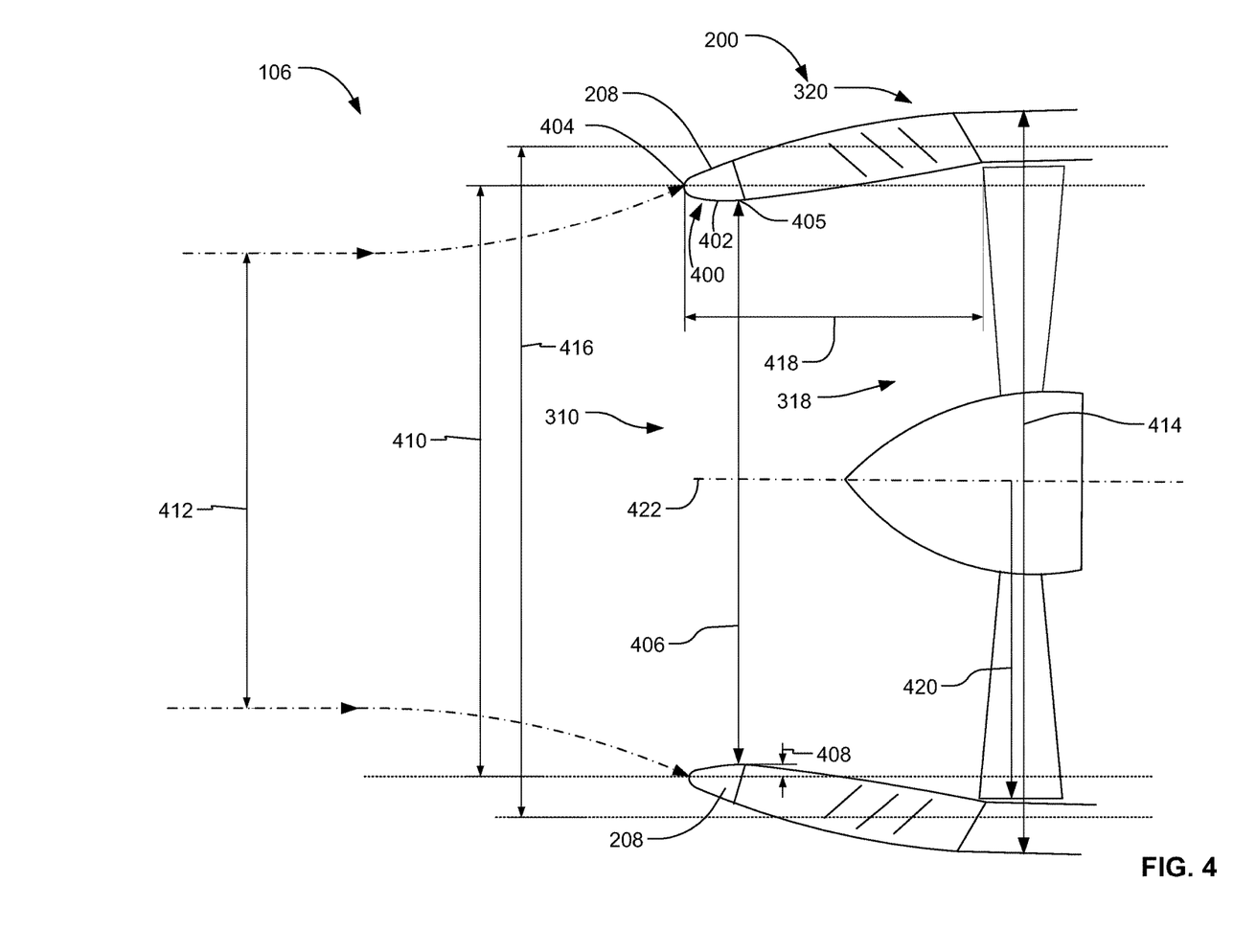
FIG. 4 is an enlarged cross-sectional view of the example aircraft engine of FIGS. 1-3.

FIG. 4 is a partial schematic illustration of the aircraft engine 106. The leading edge 208 of the nacelle 200 defines an inlet lip 400 (e.g., a bell mouth lip). The inlet lip 400 includes an inner surface 402 from a leading edge highlight 404 to a throat point 405 defining a minimum flow path area 406 (e.g., a throat area or diameter). The inlet lip 400 has a thickness 408 between the leading edge highlight 404 and the inner surface 402 defining the minimum flow path area 406. An area of the inlet lip 400 is represented by a ratio of a highlight capture area 410 (e.g., an area defined by a highlight or highlight diameter) minus the minimum flow path area 406. By reducing the thickness 408 of the inlet lip 400, an outer nacelle or cowl diameter 414 of the nacelle 200 can be reduced, thereby reducing frontal area and surface area drag during cruise conditions and/or weight penalties associated with the nacelle 200. Additionally, to limit spillage drag during cruise, an inlet capture mass flow ratio (freestream airflow capture area 412 divided by the highlight capture area 410) is increased (e.g., maximized). The freestream airflow capture area 412 is a constant for a same amount of thrust that is provided by the aircraft engine 106 compared to a known aircraft engine. Thus, the highlight capture area 410 of the aircraft engine 106 is reduced compared to a highlight area 416 of known aircraft engines that do not include a movable or translating cowl in accordance with the teachings of this disclosure. As noted above, the highlight area of known aircraft engines is defined by an inlet lip thickness that is provided to prevent or reduce boundary airflow separation along the inner and outer surfaces (e.g., the inner surface 402) of a nacelle during take-off conditions and/or cross-winds. Thus, a highlight of known aircraft engines is positioned farther away from the highlight capture area 410 of the aircraft engine 106 increasing frontal area by approximately, but not limited to, 11% that increases form drag.

To reduce the highlight capture area 410 of the aircraft engine 106, the thickness 408 of the inlet lip 400 is reduced by approximately, but not limited to, 60% with the increased inlet capture mass flow ratio (e.g., compared to inlet lips of known aircraft). The outer diameter 414 of the nacelle 200 is reduced by approximately, but not limited to, 11% (e.g., compared to nacelles of known aircraft). The highlight capture area 410 is set or determined based on the thickness 408 of the inlet lip 400 of the air intake 310 required for take-off that would reduce or prevent flow separation adjacent a boundary of the air intake 310. The outer diameter 414 of the nacelle 200 may be set relative to the highlight capture area 410. As described in greater detail below, reducing the thickness 408 of the inlet lip 400 is achieved by providing additional airflow to the air intake 310 via the auxiliary flow path 320. Typically, reducing the thickness 408 of the inlet lip 400 increases a rate of flow turning adjacent a boundary layer of the air intake 310 causing an increase in acceleration around the inlet lip 400, which can lead to flow separation at the boundary or inner surface 402 of the nacelle 200. However, the auxiliary flow path 320 when in an open position reduces direct axial airflow 318 and, thus, reduces airflow around the leading edge highlight 404, thereby reducing airflow acceleration around the leading edge highlight 404 and the inner surface 402 to allow for a reduced thickness 408 of the inlet lip 400. Further, the auxiliary flow path 320 provides additional airflow to the air intake 310 when the inlet cowl 202 is in the open position. Thus, the nacelle 200 of the illustrated example enables a highlight capture diameter of the highlight capture area 410 of the air intake 310 to be closer to a diameter of the freestream airflow capture area 412 during cruise conditions, thereby increasing the inlet capture mass flow ratio and reducing flow spillage. As a result, the maximum diameter 414 is reduced, thereby reducing frontal area and surface area and reducing drag during cruise conditions.

Additionally, an overall length 418 of the nacelle 200 of the illustrated example is reduced when the inlet cowl 202 is in a closed position. For example, the inlet cowl 202 (e.g., and the leading edge 208) translate relative to the fan cowl 204 between the open and closed positions to change the length 418 between the fan 306 and the leading edge 208 or the leading edge highlight 404. For example, during low speeds (e.g., take-off conditions), the length 418 of the air intake 310 can be positioned to be equal to or greater than a radius 420 of the fan 306. During high speed conditions such as cruise conditions, the length 418 of the air intake 310 may be reduced to a distance that is less than the radius 420 of the fan 306. Varying the length 418 of the air intake 310 (e.g., an overall length of the nacelle in an axial direction along a longitudinal axis 422) provides a sufficient length (e.g., approximately equal to or greater than the radius 420 of the fan 306) to enable airflow (e.g., produced by crosswinds) to straighten when the aircraft 100 is traveling a low speeds (e.g., during take-off), and reduces the length 418 when the aircraft 100 is traveling at high speeds (e.g., during cruise conditions) to reduce a wetted surface area of the nacelle 200 and thereby reduce frictional forces and/or cruise drag. As a result, the example nacelle 200 of the illustrated example increases aircraft performance or efficiency by reducing drag associated with the nacelle 200 during high speed conditions (e.g., cruise conditions). For example, the example nacelle 200 of the illustrated example may reduce fuel consumption by approximately between 1% and 5% by reducing the length 418 with the reduction in maximum diameter 414.

Figure 5:
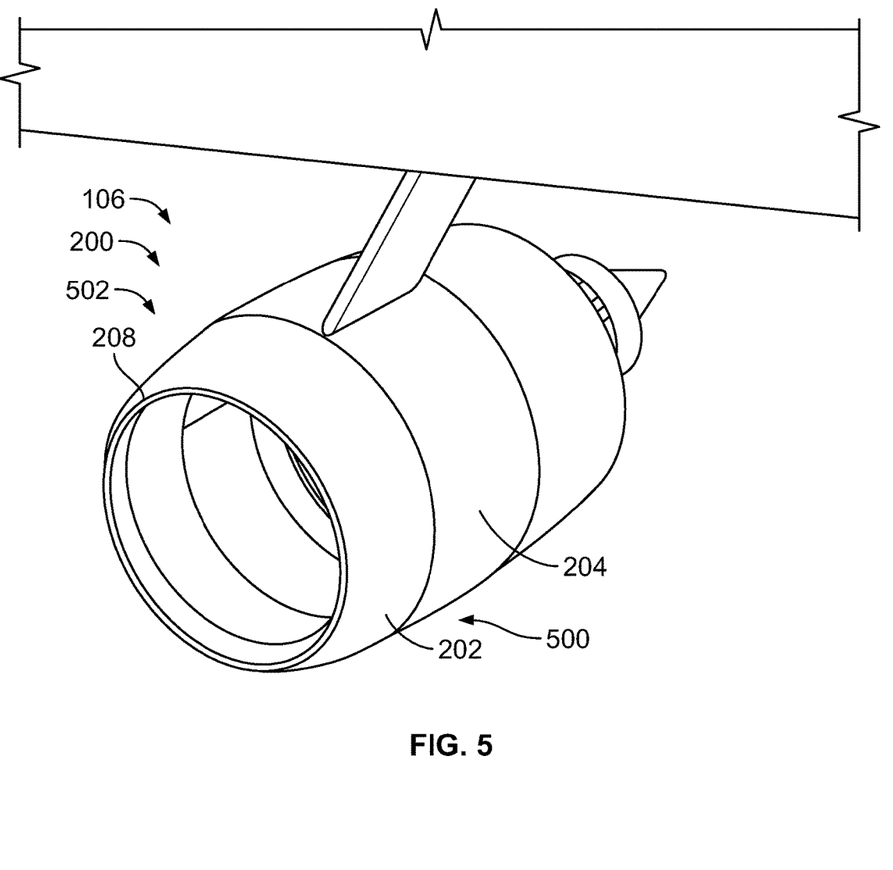
FIG. 5 illustrates the example aircraft engine of FIGS. 1-5 in a non-deployed position.

FIG. 5 is a perspective view of the aircraft engine 106 of FIGS. 1-4 showing the inlet cowl 202 in a non-deployed position 500. In the non-deployed position 500, the inlet cowl 202 is in a stowed or closed position 502 relative to the fan cowl 204. In the closed position 502, the inlet cowl 202 covers the vanes 322 (FIG. 3) to prevent airflow through the auxiliary flow path 320.

Figure 6:
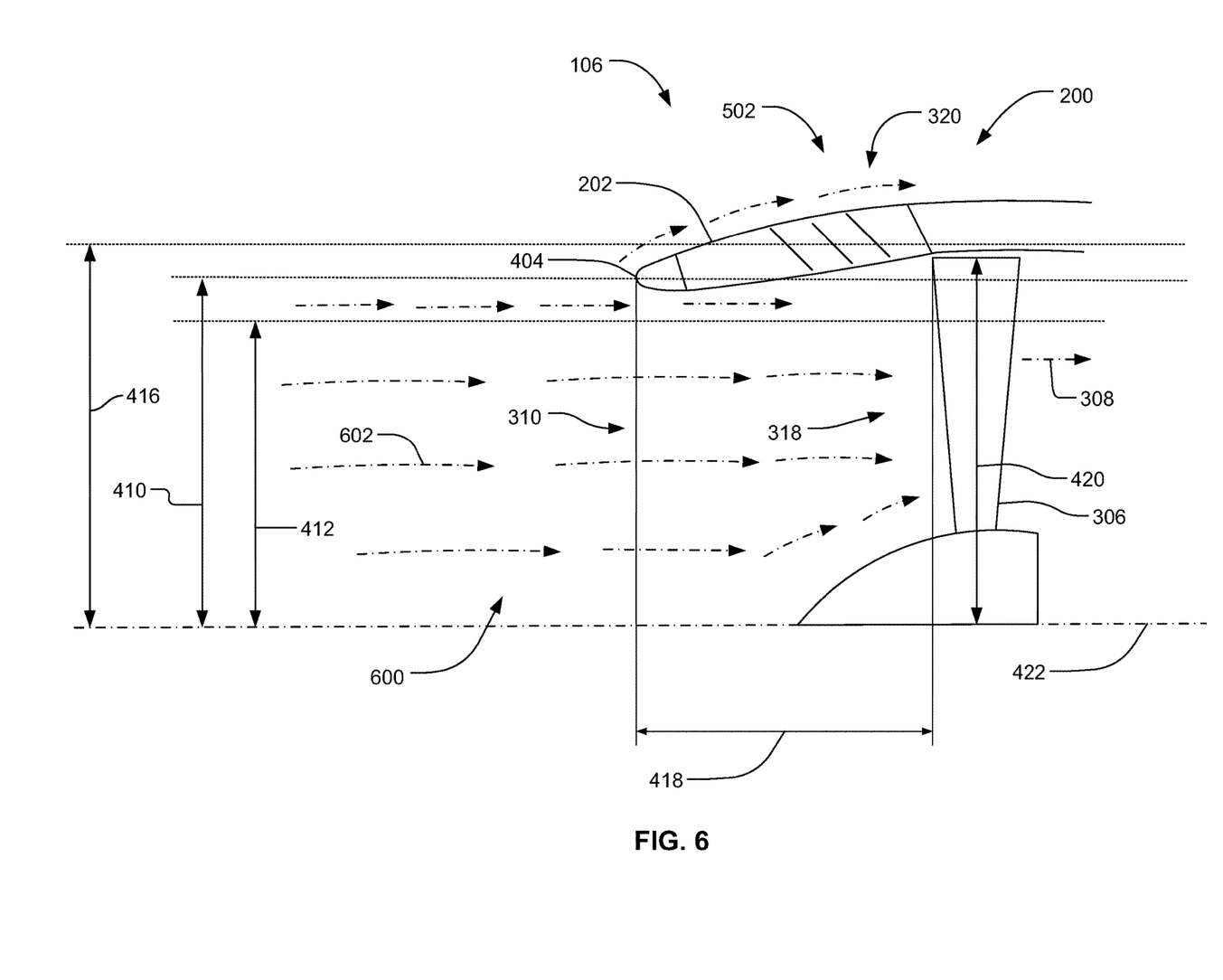
FIG. 6 is a partial cross-sectional view of the example aircraft engine of FIG. 5 in the non-deployed position.

FIG. 6 is a cross-sectional view of the aircraft engine 106 illustrating an airflow pattern 600 when the inlet cowl 202 in the closed position 502 and the aircraft 100 is traveling at relatively high speeds (e.g., cruise conditions). Referring to FIG. 6, airflow 602 is drawn into the air intake 310 via the primary flow path 318. More specifically, when the inlet cowl 202 is in the closed position 502, airflow 602 to the aircraft engine 106 is provided only via the primary flow path 318. In other words, the inlet cowl 202 prevents airflow through the auxiliary flow path 320 when the inlet cowl 202 is in the closed position 502 (e.g., airflow is prevented from flowing through the auxiliary flow path 320). Instead, the airflow 602 is directed to the fan 306 through the primary flow path 318 (e.g., in a direction substantially parallel to the longitudinal axis 422) and to the bypass 304 (FIG. 3) and the engine core 302 (FIG. 3). Additionally, as noted above, airflow spillage is reduced because the thickness 408 (FIG. 4) of the leading edge highlight 404 enables the highlight capture area 410 (e.g., a highlight diameter of the nacelle 200) to be closer to the freestream airflow capture area 412 (e.g., a free stream capture diameter) compared to the aircraft highlight capture area 416 (e.g., a highlight capture diameter) of known aircraft, thereby significantly reducing spillage flow and allowing a reduced maximum diameter 414 to reduce drag associated with the nacelle 200 during cruise conditions. Further, the length 418 of the air intake 310 (e.g., a distance between the fan 306 and the leading edge 208 or the leading edge highlight 404) is less than the radius 420 of the fan 306 that further reduces surface area, resulting in reduction of friction drag during cruise.

Figure 7:
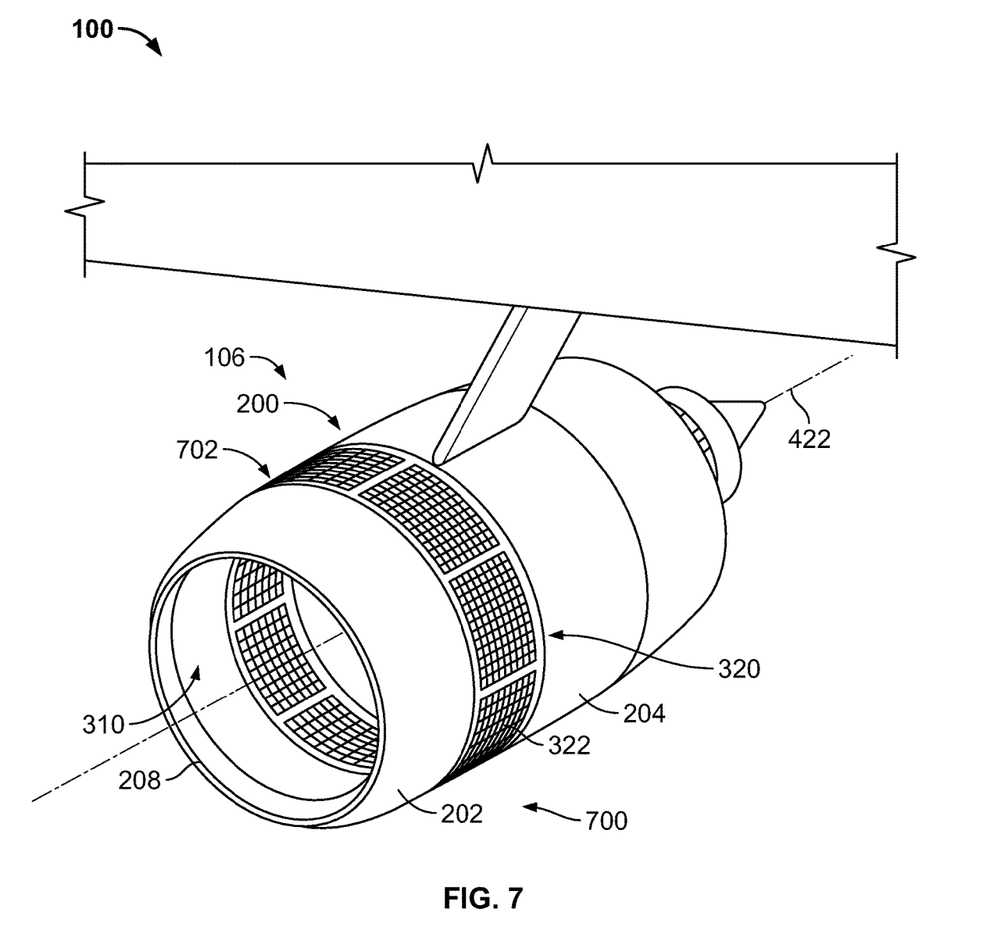
FIG. 7 illustrates the example aircraft engine of FIGS. 1-6 in a first deployed position.

FIG. 7 is a perspective view of the aircraft engine 106 of FIGS. 1-6 showing the inlet cowl 202 in a deployed position 700. As illustrated in FIG. 7, the inlet cowl 202 is in an activated or first open position 702 to open the auxiliary flow path 320 to enable airflow can move through the auxiliary flow path 320. In the illustrated example, the inlet cowl 202 moves to the first open position 702 to expose the vanes 322. When the inlet cowl 202 is in the first open position 702, airflow is directed or diverted in a direction non-parallel relative to the longitudinal axis 422. In some examples, the auxiliary flow path 320 of the illustrated example directs airflow into the air intake 310. In some examples, the auxiliary flow path 320 of the illustrated example directs airflow from the air intake 310 circumferentially outward of the nacelle 200. In particular, to enable or direct airflow into the air intake 310 or direct airflow out of the air intake 310, the example vanes 322 of the illustrated example move or rotate relative to the longitudinal axis 422 between a first position (e.g., a first plurality of angles relative to the longitudinal axis 422) and a second position (e.g., a second plurality of angles relative to the longitudinal axis 422).

Figure 8:
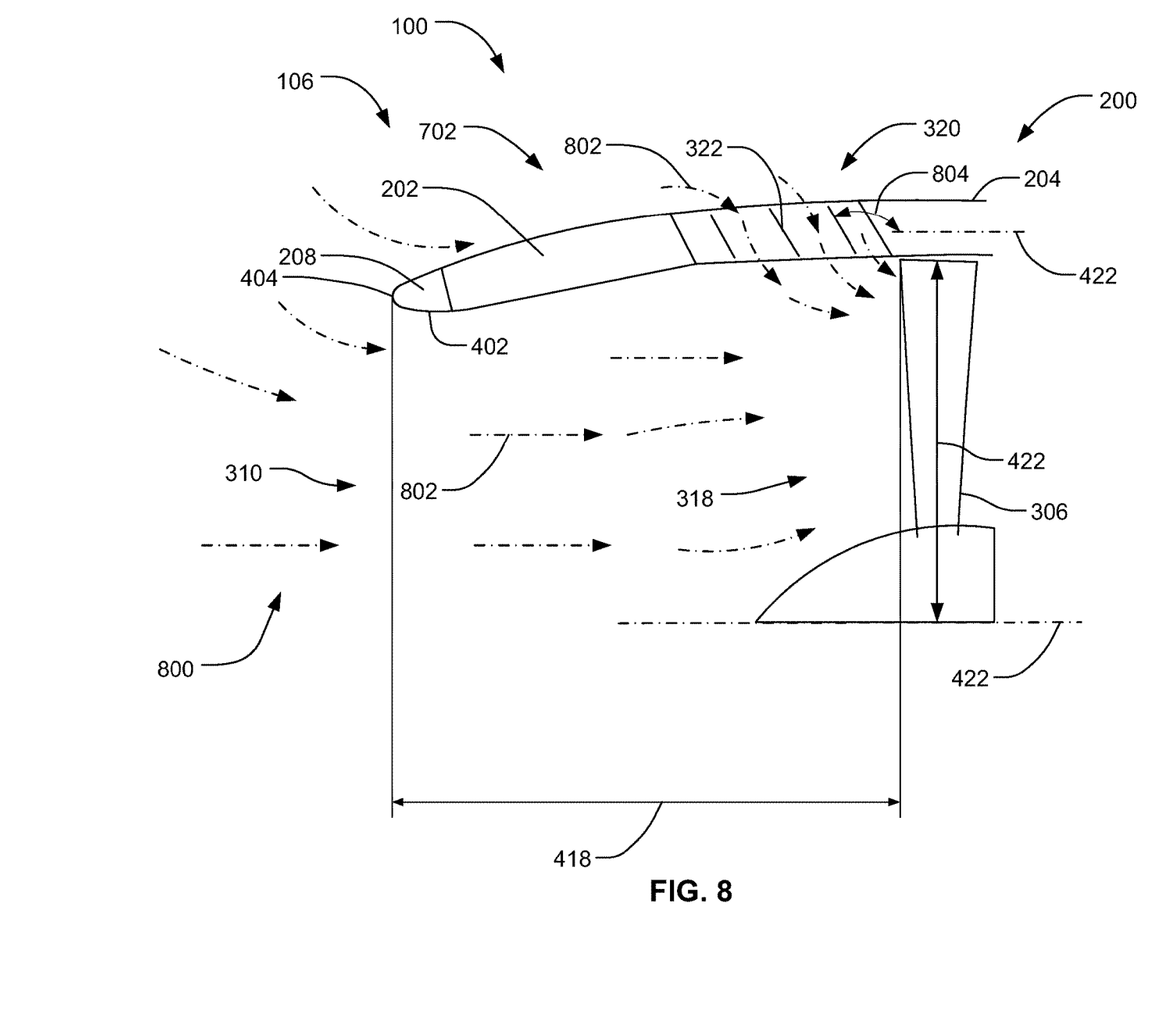
FIG. 8 is a partial cross-sectional view of the example aircraft engine of FIG. 7 in the first deployed position.

FIG. 8 is a cross-sectional view of the aircraft engine 106 illustrating an airflow pattern 800 when the inlet cowl 202 in the first open position 702 and the aircraft 100 is traveling at relatively low speeds (e.g., take-off conditions and/or prior to climb of the aircraft 100). Referring to FIG. 8, airflow 802 into the air intake 310 is provided by the primary flow path 318 and the auxiliary flow path 320. To provide airflow 802 through the auxiliary flow path 320, the inlet cowl 202 is positioned to the first open position 702 to expose the auxiliary flow path 320. In particular, the vanes 322 are positioned at an angle 804 (e.g., a first plurality of angles) relative to the longitudinal axis 422 to provide an angle of attack that directs airflow 802 from outside or externally relative to the nacelle 200 into the air intake 310 and toward the fan 306. The vanes 322 of the illustrated example may be positionable between, for example, a small angle or larger angle (e.g., between 90 degrees and 170 degrees) relative to the longitudinal axis 422 when the inlet cowl 202 is positioned (e.g., retracted or extended) for inflow or outflow. For example, the aircraft engine 106 may include a second actuator and/or a track to move or rotate the vanes 322 and/or alter an angle of attack of the vanes 322. In some examples, the vanes 322 are fixed and do not move, alter or change position or an angle of attack. Further, the inlet cowl 202 of the illustrated example increases the length 418 of the air intake 310 when the inlet cowl 202 is in the first open position 702. For example, the length 418 between the leading edge 208 and the fan 306 increases in the axial direction along the longitudinal axis 422 when the inlet cowl 202 moves from the closed position 502 to the first open position 702. In this manner, airflow 802 in the primary flow path 318 has a sufficient length to straighten (e.g., become substantially parallel relative to the longitudinal axis 422) prior to reaching the fan 306 during, for example, crosswind conditions in which the airflow 802 is flowing into the air intake 310 via the primary flow path 318 in a direction non-parallel (e.g., perpendicular) relative to the longitudinal axis 422. For example, cross-wind conditions may occur when the air intake 310 experiences airflow substantially perpendicular to a direction of travel of the aircraft 100 during take-off. Additionally, increasing the length 418 of the air intake 310 during low speed reduces airflow boundary layer separation that may otherwise be caused by a rate of acceleration of the airflow 802 along the inner surface 402 and/or the leading edge 208 (e.g., an outer surface of the leading edge).

Figure 9:
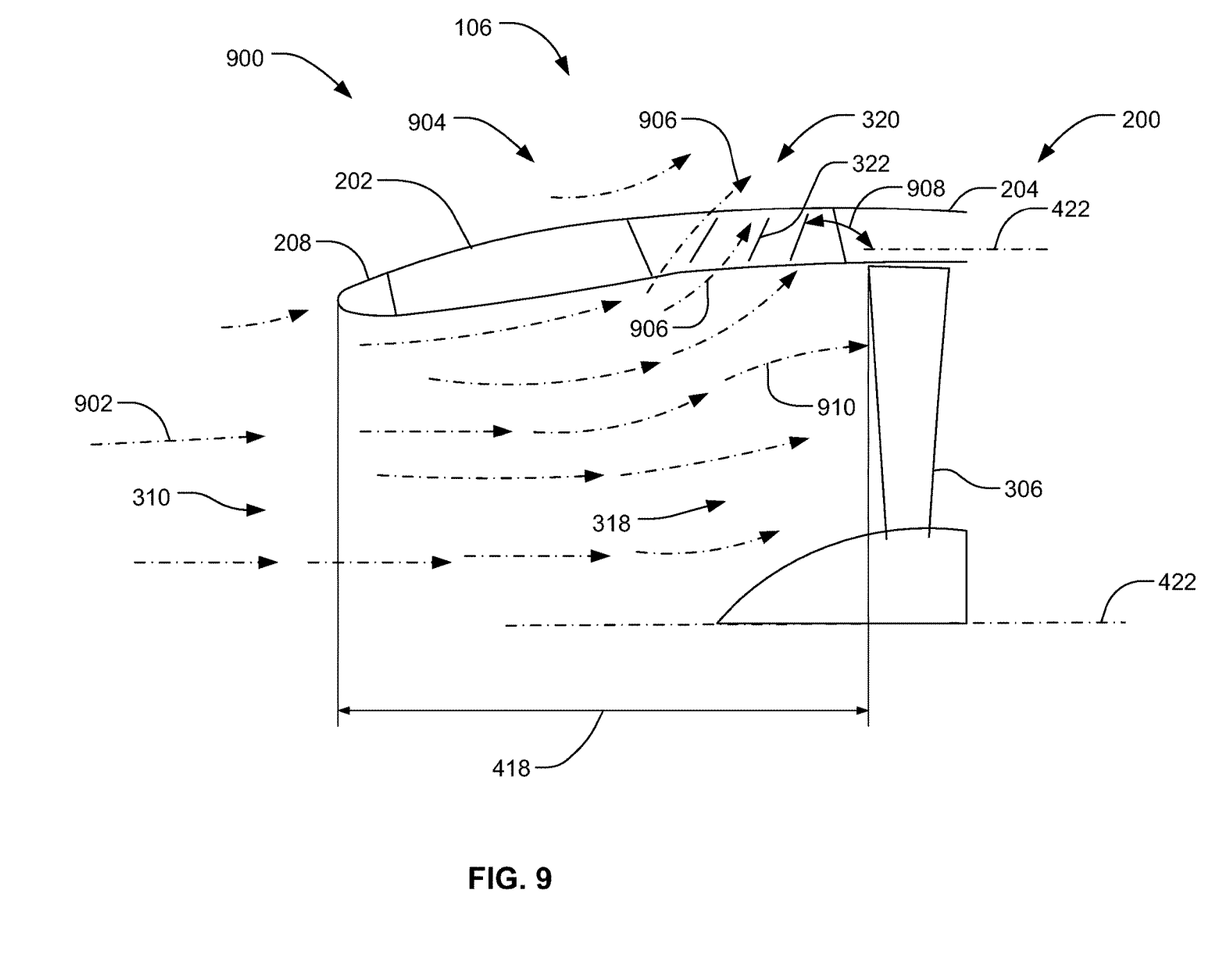
FIG. 9 is a partial cross-sectional view of the example aircraft engine of FIGS. 1-4 shown in a second deployed position.

FIG. 9 is a cross-sectional view of the aircraft engine 106 during an engine out condition 900. During an engine out condition 900, the aircraft engine 106 may experience windmilling, where the aircraft engine 106 is permitted to rotate and is driven by an airflow 902 resulting from the forward velocity of the aircraft 100 (i.e., provided via the other engines of the aircraft 100). During the engine out condition 900, the inlet cowl 202 of the illustrated example may be positioned to a second open position 904. The second open position 904 increases the length 418 of the air intake 310 compared to the length 418 of the air intake 310 when the inlet cowl 202 is in the first open position 702 as shown, for example, in FIGS. 7 and 8. However, in some examples, the inlet cowl 202 may be positioned at the first open position 702 during engine out condition 900. During the engine out condition 900, the auxiliary flow path 320 of the illustrated example directs airflow 906 from the air intake 310 circumferentially outward of the nacelle 200. To facilitate airflow 906 from the air intake 310 outward of the nacelle 200, the vanes 322 of the illustrated example are positioned (e.g., rotated) at an angle 908 (e.g., a plurality of second angles) relative to the longitudinal axis 422 to provide an angle of attack that directs the airflow 906 out from the air intake 310. Thus, a portion of the airflow 910 in the air intake 310 is directed toward the fan 306 via the primary flow path 318 and another portion of the airflow 906 in the air intake 310 is directed outside of the air intake 310 via the auxiliary flow path 320 (e.g., circumferentially outward of the nacelle 200) and away from the fan 306. In some examples, the inlet cowl 202 does not move to the second open position 904.

Figure 10:
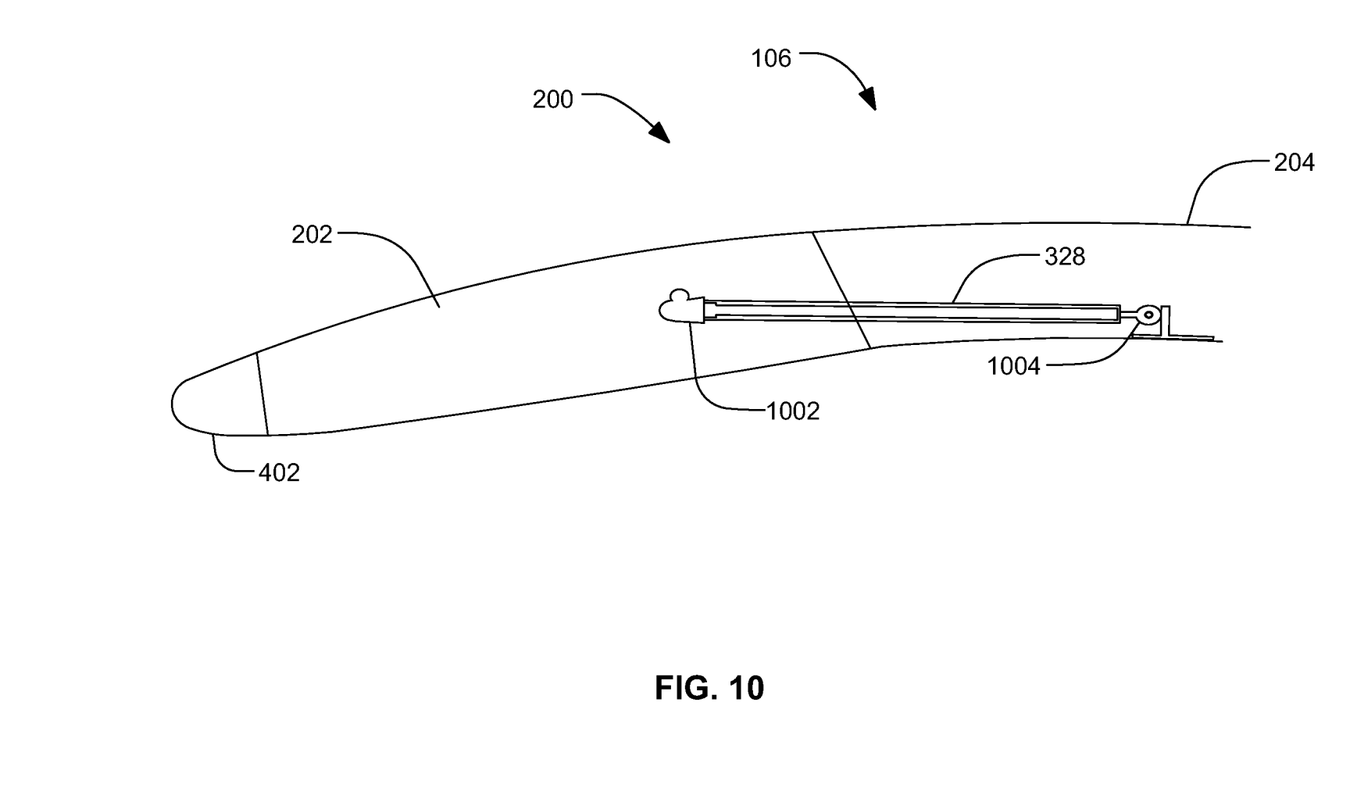
FIG. 10 is a partial cross-sectional view of the example aircraft engine of FIGS. 1-9.

FIG. 10 is a partial cross-sectional view illustrating the example actuator 328 of the nacelle 200. The actuator 328 of the illustrated example has a first end 1004 mounted within the fan cowl 204 and a second end 1002 opposite the first end coupled to the inlet cowl 202. The second end 1002 moves relative to the first end 1004 to extend or retract the inlet cowl 202 relative to the fan cowl 204 to move the inlet cowl 202 between the closed position 502, the first open position 702 and the second open position 904.

From the foregoing, it will be appreciated that the above disclosed methods, apparatus and articles of manufacture use an actuated translating cowl with variable or movable vanes to reduce a size of an inlet of subsonic turbofan aircraft nacelles during cruise. The translating cowl is extended during take-off to provide auxiliary airflow. As a result of the auxiliary airflow, an inlet lip of the nacelle disclosed herein may be formed with a substantially smaller thickness. Reducing the lip thickness reduces the leading edge highlight diameter to reduce spillage flow during cruise when the translating cowl is in the closed or retracted position to provide a shorter inlet with a lower frontal inlet area during cruise. The translating cowl may also be used during engine out condition to increase the inlet capture flow to reduce spillage with a windmilling engine to enable a lower frontal inlet area. The reduced length of the front area reduces drag during cruise. Further, employing an actuator to translate the cowl instead of using ram pressure air to close, for example, blow-in-doors enables the translating cowl to move to a closed position after take-off and during a climb condition of the aircraft (e.g., independent of ram pressure). In some examples, the translating cowl moves to the closed position just after the landing gear or wheels of an aircraft lift away from or off the runway.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A nacelle apparatus for use with an aircraft engine comprising:
a fan cowl; and
an inlet cowl movably coupled to the fan cowl, the inlet cowl defining a primary flow path and an auxiliary flow path of an intake of the aircraft engine, the inlet cowl to move relative to the fan cowl between an open position to uncover a vane positioned in the auxiliary flow path to allow airflow via the auxiliary flow path and a closed position to cover the vane positioned in the auxiliary flow path to prevent airflow through the auxiliary flow path, the open position including a first open position and a second open position, the inlet cowl to be positioned at a first axial distance from the fan cowl when the inlet cowl is in the first open position and a second axial distance from the fan cowl when the inlet cowl is in the second open position, the second axial distance being greater than the first axial distance.

2. The nacelle apparatus of claim 1, wherein the vane is movable between a first position and a second position.

3. The nacelle apparatus of claim 2, wherein the vane is to direct airflow towards a fan of the aircraft engine when the inlet cowl is in the first open position and the vane is in the first position.

4. A nacelle apparatus for use with an aircraft engine comprising:
a fan cowl; and
an inlet cowl movably coupled to the fan cowl, the inlet cowl defining a primary flow path and an auxiliary flow path of an intake of the aircraft engine, the inlet cowl to move relative to the fan cowl between a first open position and a second open position to uncover a vane positioned in the auxiliary flow path to allow airflow via the auxiliary flow path and a closed position to cover the vane positioned in the auxiliary flow path to prevent airflow through the auxiliary flow path, the inlet cowl to be positioned at a first axial distance from the fan cowl when the inlet cowl is in the first open position and a second axial distance from the fan cowl when the inlet cowl is in the second open position, the second axial distance being greater than the first axial distance, wherein the vane is movable between a first position and a second position, and wherein the vane is to direct airflow away from a fan of the aircraft engine when the inlet cowl is in the second open position and the vane is in the second position.

5. The nacelle apparatus of claim 1, further comprising an actuator to move the inlet cowl between the first open position or the second open position and the closed position.

6. The nacelle apparatus of claim 1, wherein the inlet cowl is to move to the first open position during a take-off condition of an aircraft and the second open position during an engine out condition of the aircraft engine.

7. The nacelle apparatus of claim 1, wherein a thickness between an inlet lip and a throat point of the inlet lip is reduced compared to an aircraft engine that does not employ the auxiliary flow path.

8. A nacelle apparatus for use with an aircraft engine comprising:
a forward section defining an air intake of the aircraft engine, the forward section to move relative to an intermediate section, the intermediate section to house a fan of the aircraft engine; and
an inlet lip coupled to the forward section, the forward section to translate relative to the intermediate section between a first open position and a closed position to change an axial length between the inlet lip and the fan, the forward section defines a primary flow path when the forward section is in the closed position, the forward section and the intermediate section define the primary flow path and an auxiliary flow path when the forward section is in the first open position, the auxiliary flow path includes one or more vanes, the forward section to uncover the one or more vanes and at least a portion of the auxiliary flow path when the forward section is in the first open position and the forward section is to cover the one or more vanes and the auxiliary flow path when the forward section is in the closed position, the axial length between the inlet lip and the fan having a first length when the forward section is in the closed position and the axial length between the inlet lip and the fan has a second length when the forward section is in the first open position, the first length being smaller than the second length, and the forward section configured to move to a second open position different from the first open position, the axial length between the inlet lip and the fan having a third length when the forward section is in the second open position, the third length being greater than the second length.

9. The nacelle apparatus of claim 8, wherein the one or more vanes is to move between a plurality of angles to vary airflow in a direction toward the fan when the forward section is in the first open position.

10. The nacelle apparatus of claim 8, wherein the one or more vanes positioned within the auxiliary flow path is to move between a plurality of angles to vary airflow in a direction away from the fan when the forward section is in the second open position.

11. A method to control inlet airflow through a nacelle of an aircraft engine, the method comprising:
translating an inlet cowl relative to a fan cowl to a first open position to uncover one or more vanes of an auxiliary flow path to allow airflow to the aircraft engine via a primary flow path and the auxiliary flow path during a take-off condition of an aircraft;
translating the inlet cowl relative to the fan cowl to a closed position to cover the one or more of the vanes and the auxiliary flow path to prevent airflow through the auxiliary flow path and allow airflow to the aircraft engine via the primary flow path during a cruise condition of the aircraft, an inlet of the aircraft engine being closer to a fan of the aircraft engine in a direction along a longitudinal axis of the fan when the inlet cowl is in the closed position than when the inlet cowl is in the first open position; and
moving the inlet cowl to a second open position relative to the fan cowl during an engine out condition, the second open position to position the inlet of the nacelle farther away from the fan than the first open position.

12. The method of claim 11, further comprising moving the one or more vanes to a first position to direct airflow toward the fan of the aircraft engine via the auxiliary flow path when the inlet cowl is in the first open position.

\* \* \* \* \*